(12) United States Patent
Park et al.

(10) Patent No.: US 11,854,744 B2
(45) Date of Patent: Dec. 26, 2023

(54) MULTILAYER ELECTRONIC COMPONENT

(71) Applicant: SAMSUNG ELECTRO-MECHANICS CO., LTD., Suwon-si (KR)

(72) Inventors: Jinkyung Park, Suwon-si (KR); Dongjin Kim, Suwon-si (KR); Sunil Jeong, Suwon-si (KR); Suji Kang, Suwon-si (KR); Mun Seong Jeong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 26 days.

(21) Appl. No.: 17/398,602

(22) Filed: Aug. 10, 2021

(65) Prior Publication Data

US 2022/0189692 A1   Jun. 16, 2022

(30) Foreign Application Priority Data

Dec. 11, 2020   (KR) .................. 10-2020-0173403

(51) Int. Cl.
| | |
|---|---|
| *H01G 4/12* | (2006.01) |
| *H01G 4/008* | (2006.01) |
| *H01G 4/012* | (2006.01) |
| *H01G 4/30* | (2006.01) |

(52) U.S. Cl.
CPC .......... *H01G 4/1218* (2013.01); *H01G 4/008* (2013.01); *H01G 4/012* (2013.01); *H01G 4/30* (2013.01)

(58) Field of Classification Search
CPC ........ H01G 4/30; H01G 4/012; H01G 4/1227; H01G 4/2325; H01G 4/008; H01G 4/0085; H01G 4/12; H01G 4/224; H01G 4/228; H01G 4/232; H01G 4/248; H01G 2/065; H01G 4/1218
See application file for complete search history.

(56) References Cited

U.S. PATENT DOCUMENTS

| | | | |
|---|---|---|---|
| 2003/0142463 A1 | 7/2003 | Nakamura et al. | |
| 2007/0254799 A1* | 11/2007 | Kaneda | H01G 4/30 |
| | | | 501/139 |
| 2009/0067117 A1* | 3/2009 | Kasuya | H01G 4/30 |
| | | | 156/89.18 |
| 2013/0321977 A1 | 12/2013 | Lee et al. | |
| 2013/0321980 A1* | 12/2013 | Suzuki | H01G 4/30 |
| | | | 29/25.42 |

(Continued)

FOREIGN PATENT DOCUMENTS

| | | |
|---|---|---|
| KR | 10-0463776 B1 | 12/2004 |
| KR | 10-2012-0066945 A | 6/2012 |
| KR | 10-2013-0136247 A | 12/2013 |

*Primary Examiner* — Michael P Mcfadden
(74) *Attorney, Agent, or Firm* — Morgan, Lewis & Bockius LLP

(57) ABSTRACT

A multilayer electronic component includes a body including a dielectric layer and internal electrodes having the dielectric layer interposed therebetween in a first direction and external electrodes disposed on the body and connected to the internal electrodes, wherein the internal electrodes include nickel (Ni) and dysprosium (Dy) and 0.02 at %≤C0≤5 at % in which C0 is an atomic percentage (at %) calculated by dividing a number of atoms of Dy by a sum of a number of atoms of Ni and Dy included in the internal electrode.

26 Claims, 5 Drawing Sheets

(56) References Cited

U.S. PATENT DOCUMENTS

2014/0268484 A1* 9/2014 Kang ................ H01G 4/30
                                                                501/87
2017/0186552 A1* 6/2017 Abe ................. H01G 4/224

* cited by examiner

MULTILAYER ELECTRONIC COMPONENT

CROSS-REFERENCE TO RELATED APPLICATION(S)

This application claims benefit of priority to Korean Patent Application No. 10-2020-0173403 filed on Dec. 11, 2020 in the Korean Intellectual Property Office, the disclosure of which is incorporated herein by reference in its entirety.

BACKGROUND

1. Field

The present disclosure relates to a multilayer electronic component.

2. Description of Related Art

A multilayer ceramic capacitor (MLCC), a multilayer electronic component, is a chip-type condenser mounted on the printed circuit boards of various electronic products such as display devices including liquid crystal displays (LCDs) and plasma display panels (PDPs), computers, smartphones, cell phones, and the like, to allow electricity to be charged therein and discharged therefrom.

The MLCC is advantageously compact, ensures high capacitance, facilitates mounting, and thus may be used as a component of various types of electronic devices. Recently, as components of electronic devices have been miniaturized, demand for smaller multilayer ceramic capacitors having higher capacitance has increased.

To reduce a size and to increase capacitance of multilayer ceramic capacitors, a technology for forming thinner internal electrodes and dielectric layers is required.

However, as internal electrodes and the dielectric layers become thinner, materials for the internal electrodes and the dielectric layers are atomized, and as materials are atomized, a melting point thereof decreases, to lower a thermal contraction initiation temperature. In particular, in the case of a metal, a decrement of a thermal contraction initiation temperature due to atomization is greater than that of ceramics, and thus, as materials are increasingly atomized, a difference in the thermal contraction initiation temperature between the dielectric layer and the internal electrode increases. This may lead to a degradation of internal electrode connectivity and a reduction in smoothness, thus degrading reliability.

A related art technique for reducing the difference in a thermal contraction initiation temperature between a dielectric layer and an internal electrode includes a method of adding $BaTiO_3$ to an internal electrode paste as a ceramic additive. However, in order to form a thinner internal electrode, a material of the internal electrode is atomized, and as the material is atomized, an added amount of $BaTiO_3$, a ceramic additive, is increased due to an increase in a surface area of the material and a decrease in thermal stability. When the added amount of the ceramic additive $BaTiO_3$ increases, film density of the internal electrode decreases, and the ceramic additive $BaTiO_3$ moves to the dielectric layer as a firing process proceeds to increase a thickness of the dielectric layer and decrease capacitance.

Therefore, development of a novel additive to replace $BaTiO_3$, a related art ceramic additive, is required.

SUMMARY

An aspect of the present disclosure is to improve reliability of a multilayer electronic component.

Another aspect of the present disclosure is to provide a multilayer electronic component having improved mean time to failure (MTTF).

Another aspect of the present disclosure is to provide a multilayer electronic component having an improved breakdown voltage (BDV).

Another aspect of the present disclosure is to provide a compact, high-capacitance multilayer electronic component having high reliability.

The objects of the present disclosure are not limited to the aforementioned contents and may be easily understood in the process of describing a specific embodiment of the present disclosure.

According to an aspect of the present disclosure, a multilayer electronic component includes: a body including a dielectric layer and internal electrodes having the dielectric layer interposed therebetween in a first direction; and external electrodes disposed on the body and connected to the internal electrodes, wherein the internal electrodes include nickel (Ni) and dysprosium (Dy) in amounts which satisfies the following formula: 0.02 at %≤C0≤5 at % in which C0 is atomic percentage (at %) calculated by dividing a number of atoms of Dy by a sum of a number of atoms of Ni and Dy included in the internal electrode.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
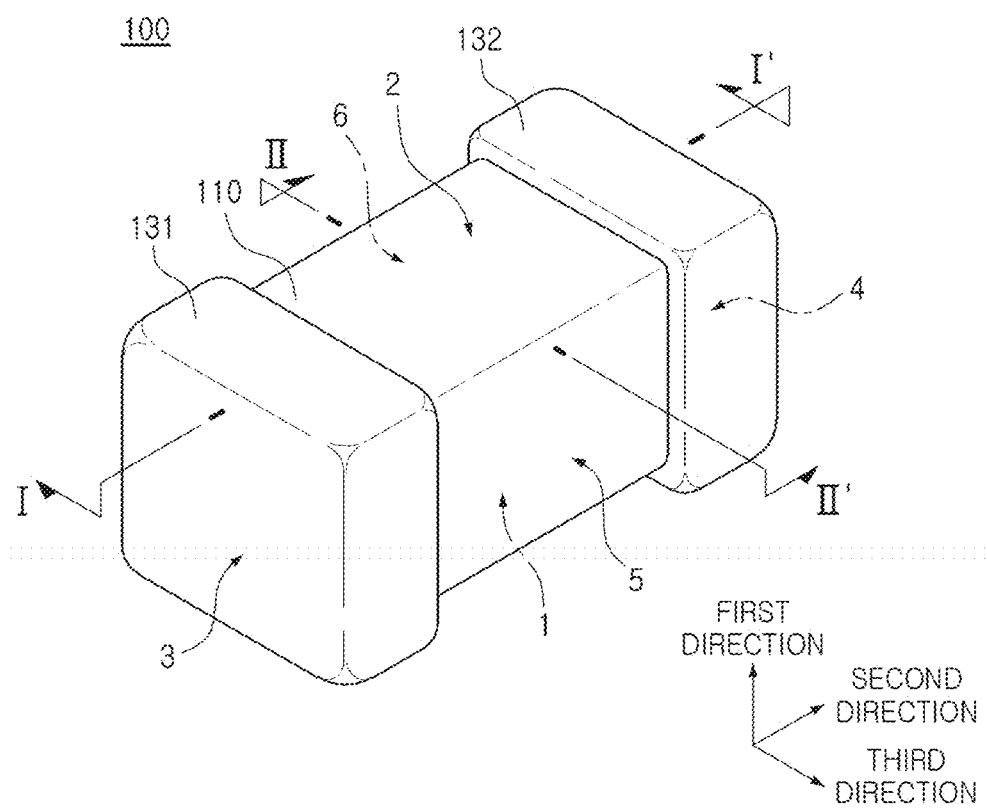
FIG. 1 is a schematic perspective view of a multilayer electronic component according to an embodiment of the present disclosure.

In the drawings, a first direction may be defined as a stacking direction or a thickness direction T, a second direction may be defined as a length direction L, and a third direction may be defined as a width direction W.

Multilayer Electronic Component

FIG. 1 is a schematic perspective view of a multilayer electronic component according to an embodiment of the present disclosure.

Figure 2:
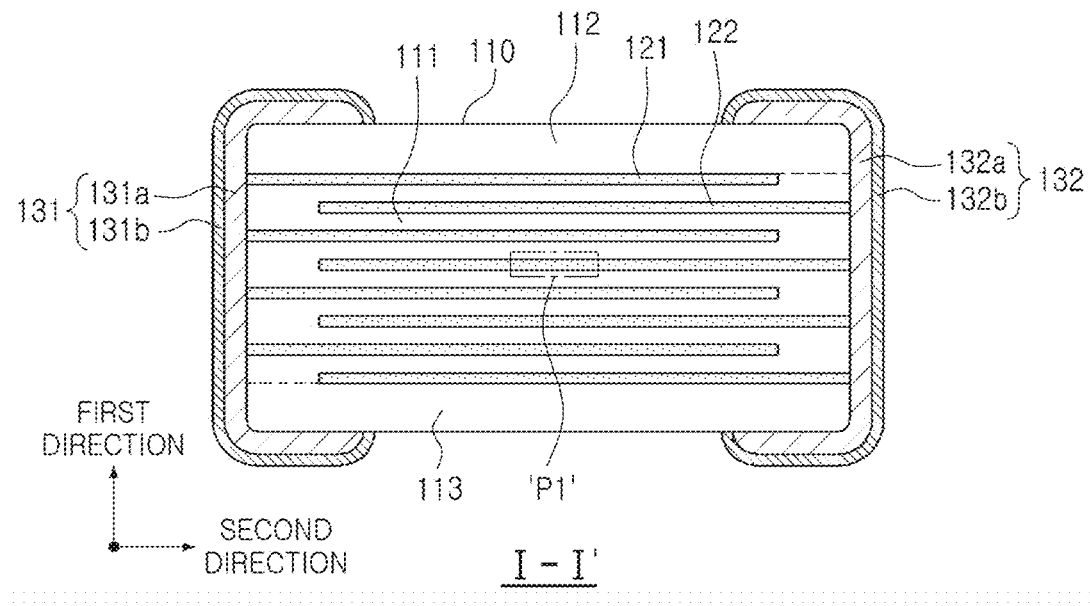
FIG. 2 is a cross-sectional view taken along line I-I' of FIG. 1.

FIG. 2 is a cross-sectional view taken along line I-I' of FIG. 1.

Figure 3:
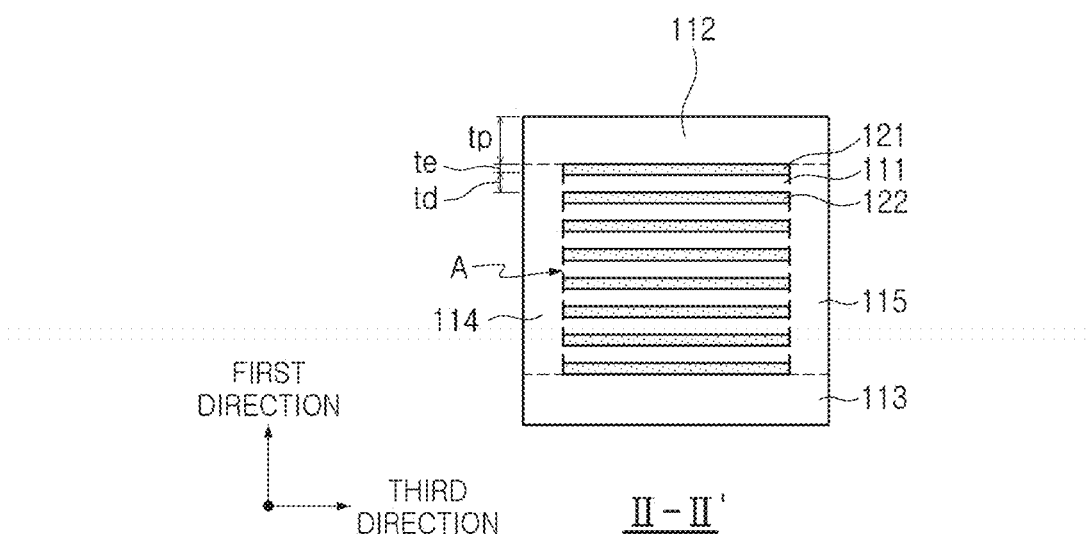
FIG. 3 is a cross-sectional view taken along line II-II' of FIG. 1.

FIG. 3 is a cross-sectional view taken along line II-II' of FIG. 1.

Figure 4:
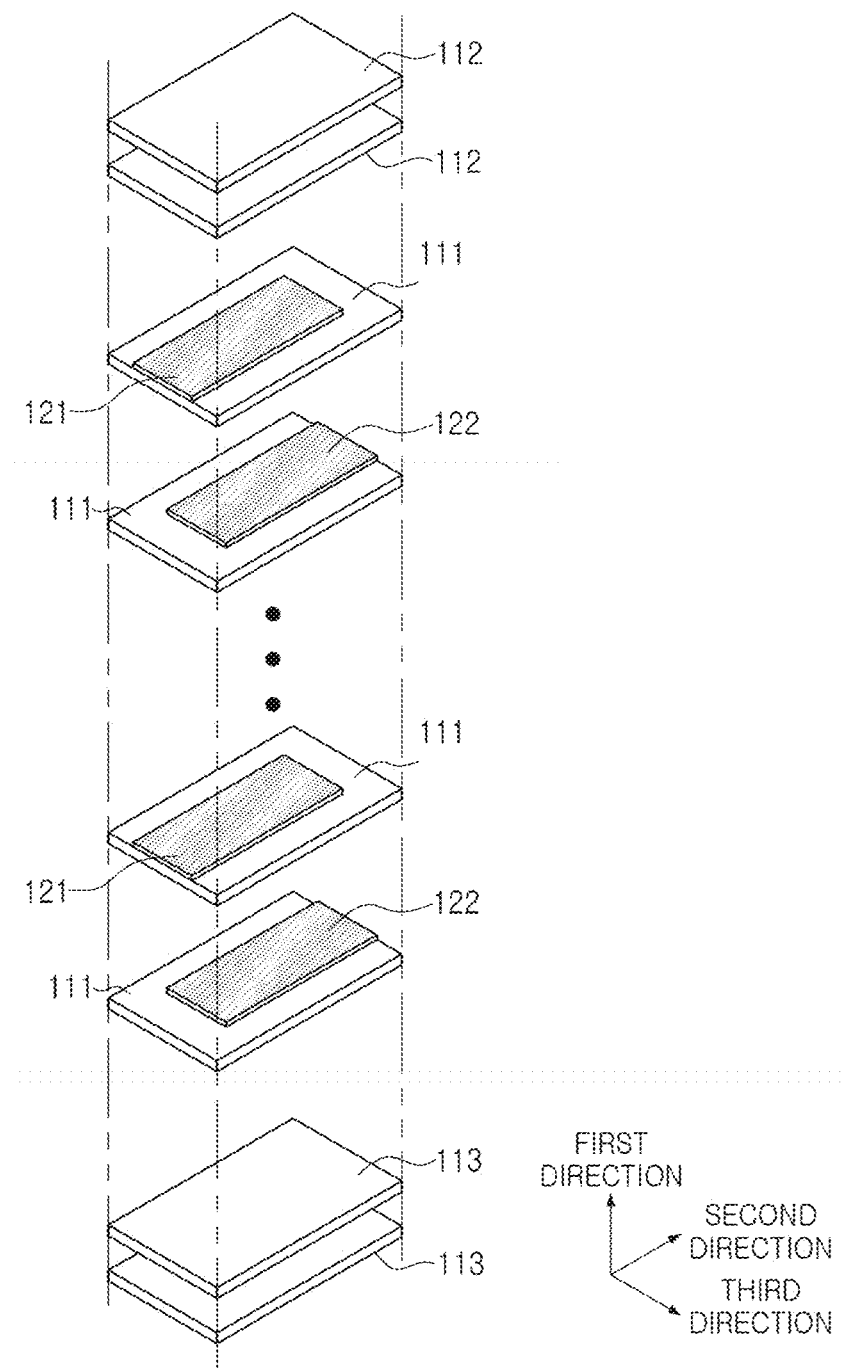
FIG. 4 is an exploded perspective view schematically illustrating a body in which a dielectric layer and an internal electrode are stacked according to an embodiment of the present disclosure.

FIG. 4 is an exploded perspective view schematically illustrating a body in which a dielectric layer and an internal electrode are stacked according to an embodiment of the present disclosure.

Figure 5:
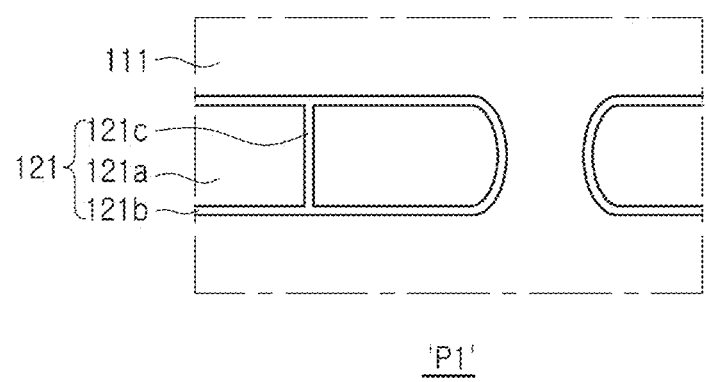
FIG. 5 is an enlarged view of region P1 of FIG. 2.

FIG. 5 is an enlarged view of region P1 of FIG. 2.

Hereinafter, a multilayer electronic component according to an embodiment of the present disclosure will be described in detail with reference to FIGS. 1 through 5.

A multilayer electronic component 100 according to an embodiment of the present disclosure includes a body 110 including a dielectric layer 111 and internal electrodes 121 and 122 having the dielectric layer interposed therebetween in a first direction; and external electrodes 131 and 132 disposed on the body and connected to the internal electrodes 121 and 122, respectively, wherein the internal electrodes 121 and 122 include nickel (Ni) and dysprosium (Dy) in an amount that satisfies an atom percentage (at %) C0 of 0.02 at % or greater or 5 at % or less, which is calculated by dividing a number of atoms of Dy by a sum of a number of atoms of Ni and Dy included in the internal electrode.

In the body 110, the dielectric layer 111 and the internal electrodes 121 and 122 are alternately stacked.

There is no particular limitation to a specific shape of the body 110, and the body 110 may have a hexahedral shape or a shape similar thereto. Due to contraction (or shrinkage) of ceramic powder particles included in the body 110 during a firing process, the body 110 may have a substantially hexahedral shape, but may not have a hexahedral shape with perfectly straight lines.

The body 110 may have first and second surfaces 1 and 2 facing each other in the first direction, third and fourth surfaces 3 and 4 connected to the first and second surfaces 1 and 2 and facing each other in the second direction, and fifth and sixth surfaces 5 and 6 connected to the first and second surfaces 1 and 2, connected to the third and fourth surfaces 3 and 4, and facing each other in the third direction.

A plurality of dielectric layers 111 forming the body 110 are in a sintered state, and adjacent dielectric layers 111 may be integrated such that boundaries therebetween may not be readily apparent without using a scanning electron microscope (SEM).

According to some embodiments of the present disclosure, a raw material for forming the dielectric layer 111 is not limited as long as sufficient electrostatic capacitance can be obtained. For example, a barium titanate-based material, a lead composite perovskite-based material, or a strontium titanate-based material may be used. The barium titanate-based material may include a $BaTiO_3$-based ceramic powder particles, and the ceramic powder particles may include $BaTiO_3$ and $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1$ and $0<y<1))$, or $Ba(Ti_{1-y}Zr_y)O_3$ $(0<y<1)$ obtained by partially dissolving calcium (Ca), zirconium (Zr), and the like in $BaTiO_3$.

As a material for forming the dielectric layer 111, various ceramic additives, organic solvents, binders, dispersants, etc. may be added to the powder particles such as barium titanate ($BaTiO_3$) according to purposes of the present disclosure.

Meanwhile, a thickness td of the dielectric layer 111 may not be limited.

However, in general, if the dielectric layer 111 is formed to be so thin as to have a thickness less than 0.6 μm, in particular, if the thickness td of the dielectric layer 111 is 0.45 μm or less, a difference in thermal contraction initiation temperature between the dielectric layer and the internal electrode increases due to the use of a particulate material, which may cause a defect such as delamination or the like to increase the likelihood of a degradation of reliability.

As described below, according to some embodiments of the present disclosure, by adjusting the concentration of Dy included in the internal electrode in consideration of the concentration of Ni included in the internal electrode, it is possible to reduce the difference in the thermal contraction initiation temperature between the dielectric layer and the internal electrode, as well as to improve thermal stability, without reducing a dielectric constant, and thus, reliability may be improved, while the thickness td of the dielectric layer 111 is secured to be as thin as 0.45 μm or less.

Therefore, when the thickness td of the dielectric layer 111 is 0.45 μm or less, the effect according to the present disclosure may be more remarkable and miniaturization and high capacitance of the multilayer electronic component may be more easily achieved.

The thickness td of the dielectric layer 111 may refer to an average thickness of the dielectric layer 111 disposed between the first and second internal electrodes 121 and 122.

The average thickness of the dielectric layer 111 may be measured by scanning an image of a length-thickness (L-T) directional cross-section of the body 110 with a scanning electron microscope (SEM).

For example, regarding a certain dielectric layer extracted from an image of the length-thickness (L-T) cross-section taken at a central portion of the body 100 in the width direction with the SEM, thicknesses thereof may be measured at 30 points at equal intervals in the length direction, and an average value thereof may be calculated.

The thicknesses measured at 30 equally spaced points may be measured at a capacitance forming portion A which refers to a region in which the first and second internal electrodes 121 and 122 overlap each other.

The body 110 may include the capacitance forming portion A, as depicted in FIG. 3, formed inside the body 110 and forming capacitance with the first internal electrode 121 and the second internal electrode 122 disposed to face each other with the dielectric layer 111 interposed therebetween and cover portions 112 and 113 formed above and below the capacitance forming portion A.

In addition, the capacitance forming portion A is a part that contributes to formation of capacitance of the capacitor, which may be formed by repeatedly stacking a plurality of first and second internal electrodes 121 and 122 with the dielectric layer 111 interposed therebetween.

The upper cover portion 112 and the lower cover portion 113 may be formed by stacking a single dielectric layer or two or more dielectric layers on upper and lower surfaces of the capacitance forming portion A in the thickness direction, respectively, and may serve to prevent damage to the internal electrodes due to chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

Meanwhile, a thickness of the cover portions 112 and 113 may not be limited. However, a thickness tp of the upper and lower cover portions 112 and 113 may be 20 μm or less in order to more easily achieve miniaturization and high capacitance in the multilayer electronic component.

In addition, margin portions 114 and 115 may be disposed on side surfaces of the capacitance forming portion A.

The margin portions may include a margin portion 114 disposed on the sixth surface 6 of the body 110 and a margin portion 115 disposed on the fifth surface 5 of the body 10. That is, the margin portions 114 and 115 may be disposed on both side surfaces of the ceramic body 110 in the width direction.

As shown in FIG. 3, the margin portions 114 and 115 may refer to a region between both ends of the first and second internal electrodes 121 and 122 and a boundary surface of the body 110 in a cross-section taken in the width-thickness (W-T) direction of the body 110.

The margin portions 114 and 115 may basically serve to prevent damage to the internal electrodes due to physical or chemical stress.

The margin portions 114 and 115 formed as the internal electrodes are formed by applying a conductive paste on a ceramic green sheet excluding a region where the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking (lamination) and subsequently stacking a single dielectric layer or two or more dielectric layers on both side surfaces of the capacitance forming portion A in the width direction.

The internal electrodes 121 and 122 may be alternately disposed with the dielectric layer 111.

The internal electrodes 121 and 122 may include first and second internal electrodes 121 and 122. The first and second internal electrodes 121 and 122 may be alternately disposed to face each other with a dielectric layer 111 configuring the body 110 interposed therebetween and may be exposed to the third and fourth surfaces 3 and 4 of the body 100, respectively.

Referring to FIG. 2, the first internal electrode 121 may be spaced apart from the fourth surface 4 and exposed to the third surface 3, and the second internal electrode 122 may be spaced apart from the third surface 3 and exposed to the fourth surface 4.

In this case, the first and second internal electrodes 121 and 122 may be electrically separated from each other by the dielectric layer 111 disposed therebetween.

Referring to FIG. 4, the body 110 may be formed by alternately stacking a ceramic green sheet on which the first internal electrode 121 is printed and a ceramic green sheet on which the second internal electrode 122 is printed and subsequently firing the green sheets.

According to some embodiments of the present disclosure, the internal electrodes 121 and 122 include nickel (Ni) and dysprosium (Dy), and 0.02 at %≤C0≤5 at % in which C0 is an atomic percentage (at %) calculated by dividing a number of atoms of Dy by a sum of a number of atoms of Ni and Dy included in the internal electrode (Dy/(Ni+Dy)).

For the purpose of miniaturization and high capacitance of the multilayer electronic component, the internal electrode and the dielectric layer should be reduced in thickness. As the internal electrode and the dielectric layer are reduced in thickness, materials of the internal electrode and the dielectric layer are atomized, and as the materials are atomized, a melting point is lowered to resultantly lower the thermal contraction initiation temperature. In particular, in the case of a metal, a decrement in thermal contraction initiation temperature due to atomization is greater than that of ceramic, the difference in the thermal contraction initiation temperature between the dielectric layer and the internal electrode increases as the materials are increasingly atomized. As the difference in the thermal contraction initiation temperature between the dielectric layer and the internal electrode increases, internal electrode connectivity may be lowered and smoothness may decrease, leading to a possibility of a degradation of reliability.

The related art technique for reducing the difference in thermal contraction initiation temperature between the dielectric layer and the internal electrode includes a method of adding $BaTiO_3$ as a ceramic additive to an internal electrode paste. However, in order to form a thinned inner electrode, the material of the inner electrode is atomized, and as the material is atomized, the content of $BaTiO_3$, a ceramic additive, is increased due to an increase in a surface area of the material, a decrease in thermal stability, and the like. The increase in the content of the ceramic additive $BaTiO_3$ leads to a decrease in film density of the internal electrode, and as the firing process proceeds, the ceramic additive $BaTiO_3$ moves to the dielectric layer, making the dielectric layer thicker and reducing capacitance.

Table 1 below lists a melting point and atomic radius of each material. Referring to Table 1, a Dy oxide ($Dy_2O_3$) has a melting point higher than $BaTiO_3$ by about 800° C. or higher and has an atomic radius greater than Ti, so that the Dy oxide is rarely spread to the dielectric layer during high temperature firing, and an influence thereof on a dielectric constant, if ever, is limited. Meanwhile, in the case of aluminum oxide ($Al_2O_3$), a melting point is high, securing thermal stability, but since an atomic radius thereof is smaller than Ti, $Al_2O_3$ may form a secondary phase with the dielectric to reduce the dielectric constant.

TABLE 1

| Classification | Melting point (° C.) | Atom radius (Å) |
| --- | --- | --- |
| $BaTiO_3$ | 1,625 | Ba: 2.78, Ti: 2.00 |
| $Al_2O_3$ | 2,072 | Al: 1.82 |
| $Dy_2O_3$ | 2,408 | Dy: 2.49 |
| Ni | 1,455 | Ni: 1.62 |

In the present disclosure, the internal electrodes 121 and 122 include Dy, which has a higher melting point than $BaTiO_3$, is rarely absorbed by the dielectric layer, and does not significantly affect the dielectric constant if ever. By controlling the concentration of Dy in consideration of the concentration of Ni, the difference in the thermal contraction initiation temperature between the dielectric layer and the internal electrode may be reduced and thermal stability may be improved, without reducing the dielectric constant, thereby improving reliability.

If the atomic percentage C0 (at %), which is calculated by dividing a number atoms of Dy by a sum of a number of atoms of Ni and Dy included in the internal electrodes 121 and 122 (Dy/(Ni+Dy)), is less than 0.02 at %, the effects such as delay of the thermal contraction initiation temperature, the increase in thermal stability, the improvement of mean time to failure (MTTF), the improvement of a breakdown voltage (BDV), and the like, based on the addition of Dy may not be sufficient. Therefore, a lower limit of C0 may be 0.02 at %. Here, in order to further improve the effects of the improvement of the breakdown voltage and the MTTF based on the addition of Dy, the lower limit of C0 is preferably 0.05 at %. Also, in order to even further improve the effects of the improvement of the breakdown voltage and the MTTF based on the addition of Dy, the lower limit of C0 is more preferably 0.5 at %.

Meanwhile, if the atomic percentage C0 (at %), which is calculated by dividing a number atoms of Dy by a sum of a number of atoms Ni and Dy included in the internal electrodes 121 and 122, is greater than 5 at %, the proportion of Dy to the internal electrodes 121 and 122 may increase due to the excessive addition of Dy and there may be a concern that capacitance per unit volume of the multilayer electronic component will decrease as a chip thickness may increase. Thus, an upper limit of C0 is preferably 5 at % to secure capacitance similar to, equal to or higher than a case in which the internal electrode does not include Dy. Here, the upper limit of C0 is more preferably 1 at % to ensure the effect of improving the capacitance, compared to the case in which the internal electrode does not include Dy.

Meanwhile, forms of Dy included in the internal electrode are not particularly limited. That is, Dy may be present in a form combined with Ni, $Dy_2O_3$ in the form of a Dy oxide, or Ni—Dy—O in the form of a complex oxide with Ni.

In some embodiments, a multilayer electronic component 100 may include a body 110 including a dielectric layer 111 and internal electrodes 121 and 122 alternately disposed with the dielectric layer in the first direction; and external electrodes 131 and 132 disposed on the body and connected to the internal electrodes 121 and 122, respectively, wherein the internal electrodes may include a Dy oxide and may not include Ba. Since the Dy oxide, rarely adsorbed to the dielectric layer, while having a melting point higher than $BaTiO_3$, and which does not significantly affect a dielectric constant if ever, is added in place of $BaTiO_3$, a generally used ceramic additive, the difference in the thermal contraction initiation temperature between the dielectric layer and the internal electrode may be reduced and thermal stability may be improved, without reducing the dielectric constant, thereby improving reliability.

In some embodiments, the amounts of Dy and Ni included in the internal electrodes satisfy the following formula: C0<C1 in which C1 is an atomic percentage (at %) calculated by dividing a number of atoms of Dy by a sum of a number of atoms of Ni and Dy (Dy/(Ni+Dy)) in a region of the internal electrodes 121 and 122 having a distance of 2 nm or less from an interface with the dielectric layer 111 in the first direction.

Dy included in the internal electrodes 121 and 122 serves to increase a sintering initiation temperature by suppressing contraction initiation of Ni powder particles at an initial stage of sintering, and moves to the interface with the dielectric layer as sintering proceeds. Accordingly, a concentration of Dy at the interface between the internal electrode and the dielectric layer may be higher than that of C0. As the concentration of Dy at the interface between the internal electrode and the dielectric layer increases, agglomeration of the internal electrodes may be suppressed and internal electrode connectivity may be improved.

In some embodiments, regarding C1, 0.07 at %≤C1≤7 at % may be satisfied.

If C1 is less than 0.07 at %, an average concentration of Dy included in the entire internal electrodes is lowered, and thus the effects of delaying the thermal contraction initiation temperature, increasing thermal stability, improving MTTF, and the like based on the addition of Dy may be insufficient. Therefore, a lower limit of C1 is preferably 0.07 at %. Here, in order to further improve the effects of improving a breakdown voltage and the MTTF based on the addition of Dy, the lower limit of C1 may be more preferably 0.7 at %. In addition, in order to even further improve the effects of improving the breakdown voltage and the MTTF based on the addition of Dy, the lower limit of C1 may be even more preferably 2 at %.

Meanwhile, if C1 is more than 7 at %, the proportion of Dy to the internal electrode may increase due to the excessive addition of Dy and there is a concern that capacitance per unit volume of the multilayer electronic component decreases as a chip thickness may increase. Therefore, in order to secure capacitance similar to or equal to or higher than a case in which Dy is not included, an upper limit of C1 is preferably 7 at %. Here, the upper limit of C1 is more preferably 5 at % to secure the effect of improving the capacitance compared to the case in which Dy is not included.

In some embodiments, C2≤2.3 at % and C2<C0<C1 in which C2 is an atomic percentage (at %) calculated by dividing a number of atoms of Dy by a sum of a number of atoms of Ni and Dy at the center of the internal electrode in the first direction.

Since Dy included in the internal electrodes 121 and 122 moves to the interface with the dielectric layer 111 as sintering proceeds, a concentration of Dy at the center of the internal electrode in the first direction may be smaller than a concentration of Dy at the interface with the dielectric layer 111 and an average concentration of Dy included in the entire internal electrode.

If C2 is more than 2.3 at %, the proportion of Dy to the internal electrode may increase due to the excessive addition of Dy, and a chip thickness may increase, leading to a possibility of decreasing capacitance per unit volume of the multilayer electronic component. Therefore, an upper limit of C2 is 2.3 at % to secure capacitance similar to or equal to or higher than a case in which Dy is not included. Here, the upper limit of C2 is more preferably 0.8 at % to ensure the effect of improving the capacitance, compared to the case in which Dy is not included.

Meanwhile, a lower limit of C2 is not limited and may have a value of 0 or close to 0. However, in order to further improve the breakdown voltage and the MTTF improvement effect based on the addition of Dy, a lower limit of C2 is more preferably 0.05 at %. In addition, in order to further improve the breakdown voltage and the MTTF improvement effect based on the addition of Dy, the lower limit of C2 is even more preferably 0.2 at %.

In some embodiments, regarding C1 and C2, 3.04≤C1/C2 may be satisfied.

A lower limit of C1/C2 is preferably 3.04 to secure the capacitance similar to or equal to or higher than the case in which Dy is not included, and is more preferably 6.25 to secure the effect of improving the capacitance compared to the case in which Dy is not included.

Meanwhile, the upper limit of C1/C2 may have a value of infinity since C2 may have a value 0 or close to 0. However, the upper limit of C1/C2 is more preferably 14 to further improve the breakdown voltage and the MTTF improvement effects, and even more preferably, 10 to even further improve the breakdown voltage and the MTTF improvement effects.

In some embodiments, the internal electrodes 121 and 122 may include a Dy oxide. As the content of Dy increases, Dy may remain in an oxide form and may exist to be trapped in the internal electrode. In particular, in a case in which C0 is 0.5 at % or more, C1 is 2 at % or more, C2 is 0.2 at % or more, or C1/C2 is 10 or less, there is a high probability that Dy exists in the form of an oxide trapped in the internal electrode.

Here, since Dy moves to the interface with the dielectric layer 111 as firing proceeds, the Dy oxide may be placed in a region extending from the interface between the internal electrode and the dielectric layer to a point that is ⅓ of the thickness of the internal electrode. That is, the Dy oxide may be disposed in a region excluding a middle portion when the internal electrode is trisected in the first direction. In addition, the Dy oxide may be $Dy_2O_3$. The middle portion includes the center of the internal electrode.

Accordingly, the breakdown voltage and MTTF improvement effects based on the addition of Dy may be further improved by improving interfacial resistance.

In some embodiments, the internal electrodes 121 and 122 may include a plurality of Ni grains 121a, and the content of Dy in a grain boundary 121c between the plurality of Ni grains may be higher than the content of Dy included in the Ni grains 121a. However, since Dy moves to the interface between the internal electrodes 121 and 122 and the dielectric layer 111 as sintering proceeds, the content of Dy at the grain boundary 121c between the plurality of Ni grains may be lower than the content of Dy included at the interface 121b between the internal electrodes 121 and 122 and the dielectric layer 111.

Figure 6:
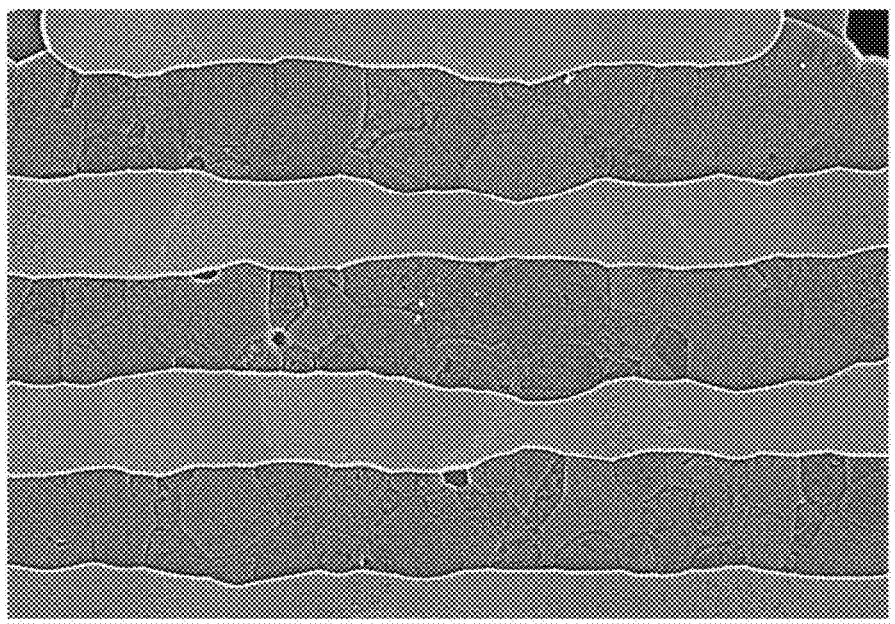
FIG. 6 is an image of a cross-section of internal electrodes according to an embodiment of the present disclosure, scanned by a scanning electron microscope (SEM)
Figure 7:
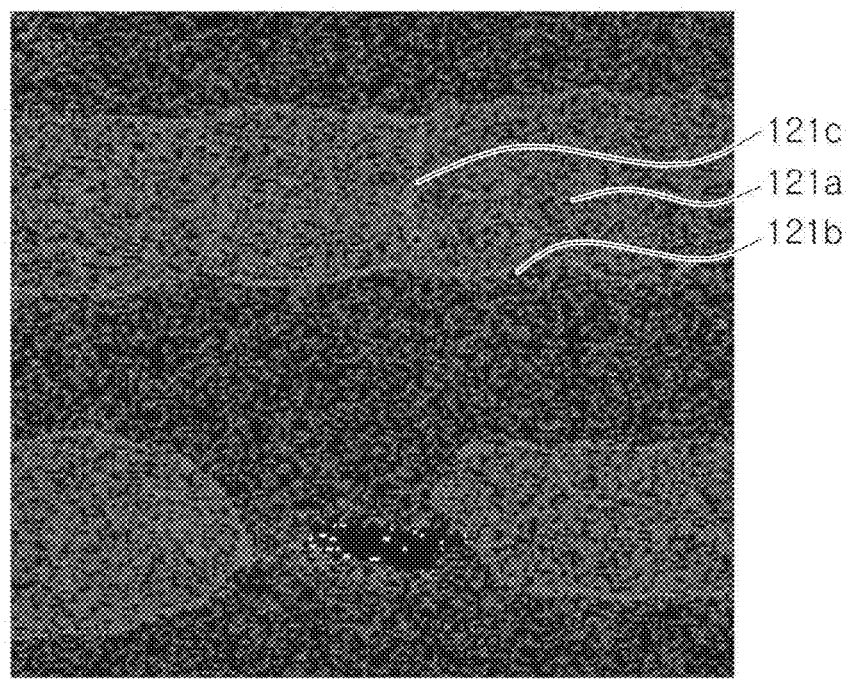
FIG. 7 is an image of a cross-section of an internal electrode according to an embodiment of the present disclosure, in which a distribution of a Dy element is observed using an SEM-energy dispersive X-ray spectrometer (EDS).

FIG. 6 is an image obtained by scanning a cross-section of an internal electrode according to an embodiment of the present disclosure with a scanning electron microscope (SEM). FIG. 7 is an image of a cross-section of an internal electrode according to an embodiment of the present disclosure, in which a distribution of Dy elements is observed using a scanning electron microscope (SEM)-energy-dispersive X-ray spectroscopy (BDS). Referring to FIG. 6, it can be seen that a layer, conspicuously different from the dielectric layer and the internal electrode, is observed at the interface between the internal electrode and the dielectric layer. Referring to FIG. 7, the content of Dy at the grain boundary 121c between the plurality of Ni grains is higher than the content of Dy included in the Ni grains 121a.

Meanwhile, a material forming the internal electrode may not be limited. For example, the internal electrode may be formed using a paste including Ni powder particles and $Dy_2O_3$ powder particles, and the concentration of Dy included in the internal electrode may be controlled after firing by adjusting anatomic percentage of $Dy_2O_3$ powder particles to Ni powder particles.

In addition, $BaTiO_3$, a ceramic additive, may not be included in the paste for an internal electrode for forming the internal electrode of the present disclosure. Accordingly, the internal electrodes 121 and 122 may not include $BaTiO_3$. According to the present disclosure, since Dy may suppress thermal contraction initiation of the internal electrode by replacing the role of $BaTiO_3$, a related art ceramic additive, even if the conductive paste for an internal electrode that does not contain $BaTiO_3$, is used, the internal electrode may be formed thinner and the reliability of the multilayer electronic component may be improved.

Meanwhile, a thickness te of the internal electrodes 121 and 122 may not be limited.

However, in general, in the case of forming the internal electrodes 121 and 122 to have a thickness less than 0.6 μm, in particular, if the thickness te of the internal electrodes 121 and 122 is 0.45 μm or less, a fine material is used, and as a result, a difference in the thermal contraction initiation temperature between the dielectric layer and the internal electrode may increase to cause a defect such as delamination or the like to degrade reliability.

As described above, according to some embodiments of the present disclosure, by adjusting the concentration of Dy included in the internal electrode in consideration of the concentration of Ni, the difference in the thermal contraction initiation temperature between the dielectric layer and the internal electrode may be reduced and thermal stability may be improved without reducing the dielectric constant, whereby reliability may be improved, while securing the thickness te of the internal electrodes 121 and 122 as thin as 0.45 μm or less.

Therefore, when the thickness te of the internal electrodes 121 and 122 is 0.45 μm or less, the effects according to the present disclosure may be more remarkable and miniaturization and high capacitance of the multilayer electronic component may be more easily achieved.

The thickness te of the internal electrodes 121 and 122 may refer to an average thickness of the internal electrodes 121 and 122.

The average thickness of the internal electrodes 121 and 122 may be measured by scanning an image of a length and thickness directional (L-T) cross-section of the body 110 with an SEM.

For example, in an image obtained by scanning a cross-section of the body 110 in the first and second directions (length and thickness directions) taken at a central portion of the body 110 in the third direction (width direction), certain first and second internal electrodes 121 and 122 may be extracted, and thicknesses thereof at 30 points at equal intervals in the length direction may be measured, and an average value of the measured thicknesses may be calculated.

The external electrodes 131 and 132 may be disposed on the body 110 and connected to the internal electrodes 121 and 122.

As shown in FIG. 2, the external electrodes 131 and 132 may be disposed on the third and fourth surfaces 3 and 4 of the body 110 and connected to the first and second internal electrodes 121 and 122, respectively.

In this embodiment, a structure in which the multilayer electronic component 100 has two external electrodes 131 and 132 is described, but the number or shape of the external electrodes 131 and 132 may be modified according to shapes of the internal electrodes 121 and 122 or other purposes.

Meanwhile, the external electrodes 131 and 132 may be formed of any material as long as the material has electrical conductivity such as a metal, and a specific material may be determined in consideration of electrical characteristics and structural stability, and further, the external electrodes 131 and 132 may have a multilayer structure.

For example, the external electrodes 131 and 132 may include electrode layers 131a and 132a disposed on the body 110 and plating layers 131b and 132b formed on the electrode layers 131a and 132a, respectively.

For a more specific example of the electrode layers 131a and 132a, the electrode layers 131a and 132a may be firing electrodes including a conductive metal and glass or resin-based electrodes including a conductive metal and a resin.

In addition, the electrode layers 131a and 132a may have a form in which a firing electrode and a resin-based electrode are sequentially formed on the body. In addition, the electrode layers 131a and 132a may be formed by transferring a sheet including a conductive metal onto the body or by transferring a sheet including a conductive metal onto the firing electrode.

A material having excellent electrical conductivity may be used as the conductive metal included in the electrode layers 131a and 132a, and the material is not particularly limited. For example, the conductive metal may be one or more of nickel (Ni), copper (Cu), or alloys thereof.

The plating layers 131b and 132b serve to improve mounting characteristics. The plating layers 131b and 132b are not limited in type and may be plating layers including at least one of Ni, Sn, Pd, or alloys thereof or may be formed of a plurality of layers.

For a more specific example of the plating layers 131b and 132b, the plating layers 131b and 132b may include a Ni plating layer or an Sn plating layer, and in this case, the Ni plating layer and the Sn plating layer may be sequentially formed on the electrode layers 131a and 132a or the Sn plating layer, the Ni plating layer, and the Sn plating layer may be sequentially formed on the electrode layers 131a and 132a. In addition, the plating layers 131b and 132b may include a plurality of Ni plating layers and/or a plurality of Sn plating layers.

A size of the multilayer electronic component 100 may not be particularly limited.

However, in order to achieve both miniaturization and high capacitance, the number of layers needs to be increased by reducing the thickness of the dielectric layer and the internal electrode, and thus, the effect of improving reliability according to the present embodiment may be remarkable in a multilayer electronic component 100 having a 0402 size (length×width, 0.4 mm×0.2 mm) or less.

Accordingly, when the length of the multilayer electronic component 100 is 0.44 mm or less and the width thereof is 0.22 mm or less, taking into account a manufacturing error and the size of external electrode, the reliability improvement effect according to the present disclosure may be more remarkable. Here, the length of the multilayer electronic component 100 refers to a maximum size of the multilayer electronic component 100 in the second direction, and the width of the multilayer electronic component 100 refers to a maximum size of the multilayer electronic component 100 in the third direction.

Exemplary Embodiment

A sample chip including an internal electrode satisfying the atomic percentage (at %) of C0 calculated by dividing a number of atoms of Dy by a sum of a number of atoms of Ni and Dy included in the entirety of the internal electrodes the atomic percentage (at %) of C1 calculated by dividing a number of atoms of Dy by a sum of a number of atoms of Ni and Dy included in a region having a distance of 2 nm or less from the interface between the internal electrode and the dielectric layer in the first direction, and the atomic percentage (at %) of C2 calculated by dividing a number if atoms of Dy by a sum of a number of atoms of Ni and Dy at the center of the internal electrode in the first direction as shown in Table 2 below were manufactured by adjusting the concentrations of the Ni powder particles and the $Dy_2O_3$ powder particles included in a paste for an internal electrode.

C0, C1 and C2 are average values of four certain internal electrodes by observing flaked samples for analysis with a STEM after the samples for analysis are manufactured using a microsampling method based on FIB in a cross-section (W-T cross-section) taken in the first and third directions at a ½ point of the sample chip in the second direction.

By line mapping a portion in which the dielectric layer and the internal electrode abut, an intermediate portion between a portion in which the concentration of Ba rapidly decreases from the dielectric layer to converge to 0 and a portion in which the concentration of Ni rapidly decreases from the internal electrode to converge to 0 was set as an interface.

As for C1, Ni and Dy at 5 points at equal intervals per internal electrode in a portion at a depth of 2 nm in the direction of the internal electrode based on the interface between the dielectric layer and the internal electrode were quantitatively analyzed by EDS and values of 20 points measured from a total of 4 internal electrodes were averaged and are described in Table 2 below. As for C2, Ni and Dy at 5 points at equal intervals per internal electrode based on the thickness direction (first direction) of the internal electrode were quantitatively analyzed and values of 20 points measured from a total of four internal electrodes were averaged and described in Table 2 below. Here, a bean resolution of the EDS was 0.14 nm, a measurement exposure time was 3 minutes, and 1 million counts were measured.

C0 was obtained by quantitatively analyzing Ni and Dy by line mapping in the first direction from the interface between an upper dielectric layer in the first direction and the internal electrode to an interface between a lower dielectric layer in the first direction and the internal electrode. An atomic percentage (at %), which was calculated by dividing a number of atoms of Dy by a sum of a number of atoms of Ni and Dy, was obtained by line mapping 5 lines at equal intervals per internal electrode, and values at 20 lines in the total of four internal electrodes were averaged and described in Table 2 below.

The capacitance, BDV and MTTF of each sample chip were measured, and based on capacitance, BDV, and MTTF of Test No. 1 in which Dy was not included in the internal electrode as reference values, relative values of other test numbers are shown in Table 2 below.

The capacitance was measured under the conditions of at 1 kHZ and AC 0.5V using an LCR meter. The capacitance of Test No. 1 was used as a reference value 1, and relative values of the other test numbers are described.

As for the BDV, each sample chip was connected to a circuit and sequentially stepped up, starting from 0V by 0.5V each time, and a voltage at a point at which a current was 20 mA or larger was determined as BDV. Here, relative values of other test numbers are shown based on the BDV of Test No. 1.

MTTF was measured by performing a high temperature load test on 400 samples per each test number under the conditions of 125° C. and 8V. Here, a time at which insulation resistance was 10KΩ or less was determined as a failure time, and a reference value 1, relative values of other test numbers are shown based on the MTTF of Test No. 1.

TABLE 2

| Test No. | C0 (at %) | C1 (at %) | C2 (at %) | C1/C2 | Capacitance | BDV | MTTF |
|---|---|---|---|---|---|---|---|
| 1* | 0 | 0 | 0 | — | 1 (reference) | 1 (reference) | 1 (reference) |
| 2 | 0.02 | 0.07 | 0.001 | 70 | 1.01 | 1.02 | 1.12 |
| 3 | 0.05 | 0.7 | 0.05 | 14 | 1.05 | 1.15 | 1.22 |
| 4 | 0.5 | 2 | 0.2 | 10 | 1.04 | 1.15 | 1.24 |
| 5 | 1 | 5 | 0.8 | 6.25 | 1.01 | 1.18 | 1.28 |
| 6 | 5 | 7 | 2.3 | 3.04 | 0.92 | 1.37 | 1.32 |
| 7* | 6 | 9 | 3 | 3 | 0.7 | 1.5 | 1.32 |

Test No. 1 is a case in which the internal electrode did not contain Dy, and based on the capacitance, BDV, and MTTF of Test No. 1, relative values of other test numbers are shown.

In Test No. 2, the atomic percentage (at %) of C0 was 0.02 at %, and it can be seen that the capacitance, BDV, and MTTF were improved compared to Test No. 1. In particular, it can be seen that MTTF was improved by 12% compared to Test No. 1, obtaining a remarkable effect.

In Test No. 3, the atomic percentage (at %) of C0 was 0.05 at %, and it can be seen that the capacitance, BDV, and MTTF were improved compared to Test No. 1. In particular, BDV was improved by 15% compared to Test No. 1, and MTTF was improved by 22% compared to Test No. 1, obtaining a remarkable effect. In addition, compared to Test No. 2, BDV was improved by 12%, and MTTF was improved by 10%, and thus, it can be seen that there was a remarkable effect even when compared to Test No. 2.

In Test Nos. 4 and 5, C0 was 0.5 at % and 1 at %, respectively, indicating the BDV and MTTF values were equal to or higher than Test No. 3, respectively, and it can be seen that the capacitance was slightly lowered as the concentration of Dy increases.

In Test No. 6, C0 was 5 at %, and BDV was improved by 37% and MTTF is improved by 32%, compared to Test No. 1, indicating that there was a very excellent effect. However, the capacitance was lowered by 8%, compared to that of Test No. 1. Further, in Test No. 7, C0 was 6 at % and, it can be seen that, the capacitance was sharply lowered by 30% compared to Test No. 1 and also lowered by 22% compared to Test No. 6.

Therefore, it can be seen that C0 is preferably 0.02 at % or more and 5 at % or less to improve BDV and MTTF, while securing the capacitance at a similar level or at an equal or higher level.

One of the various effects of the present disclosure is to improve the reliability of the multilayer electronic component by including Dy in the internal electrode.

While example embodiments have been shown and described above, it will be apparent to those skilled in the art that modifications and variations could be made without departing from the scope of the present disclosure as defined by the appended claims.

What is claimed is:

1. A multilayer electronic component comprising:
a sintered body including a dielectric layer and internal electrodes having the dielectric layer interposed therebetween in a first direction; and
external electrodes disposed on the sintered body and connected to the internal electrodes,
wherein the internal electrodes include nickel (Ni) and dysprosium (Dy) in amounts satisfying formula: 0.02 at %≤C0≤5 at % in which C0 is an atomic percentage (at %) calculated by dividing a number of atoms of Dy by a sum of a number of atoms of Ni and Dy included in the internal electrodes.

2. The multilayer electronic component according to claim 1, wherein the internal electrodes include Ni and Dy in amounts satisfying formula: C0<C1 in which C1 is an atomic percentage (at %) calculated by dividing a number of atoms of Dy by a sum of a number of atoms of Ni and Dy in a region of the internal electrode having a distance of 2 nm or less from an interface with the dielectric layer in the first direction.

3. The multilayer electronic component according to claim 2, wherein the internal electrodes include Ni and Dy in amounts satisfying formula: 0.07 at %≤C1≤7 at %.

4. The multilayer electronic component according to claim 3, wherein the internal electrodes include Ni and Dy in amounts satisfying formulae: C2≤2.3 at % and C2<C0<C1 in which C2 is an atomic percentage (at %) calculated by dividing a number of atoms of Dy by a sum of a number of atoms of Ni and Dy at a center of the internal electrode in the first direction.

5. The multilayer electronic component according to claim 4, wherein the internal electrodes include Ni and Dy in amounts satisfying formula: 3.04≤C1/C2≤70.

6. The multilayer electronic component according to claim 1, wherein the internal electrodes include Ni and Dy in amounts satisfying formula: 0.02 at %≤C0≤1 at %.

7. The multilayer electronic component according to claim 1, wherein the internal electrodes include Ni and Dy in amounts satisfying formula: 0.05 at %≤C0≤5 at %.

8. The multilayer electronic component according to claim 7, wherein the internal electrodes include Ni and Dy in amounts satisfying formulae: 0.7 at %≤C1≤7 at % and C0<C1 in which C1 is an atomic percentage (at %) calculated by dividing a number of atoms of Dy by dividing a sum of a number of atoms of Ni and Dy in a region of the internal electrode having a distance of 2 nm or less from an interface with the dielectric layer in the first direction.

9. The multilayer electronic component according to claim 8, wherein the internal electrodes include Ni and Dy in amounts satisfying formulae: 0.05 at %≤C2≤2.3 at % and C2<C0<C1 in which C2 is an atomic percentage of the content Dy to the sum of the contents of Ni and Dy at a center of the internal electrode in the first direction.

10. The multilayer electronic component according to claim 9, wherein the internal electrodes include Ni and Dy in amounts satisfying formulae: 3.04≤C1/C2≤14.

11. The multilayer electronic component according to claim 9, wherein the internal electrodes include Ni and Dy in amounts satisfying formulae: 0.5 at %≤C0≤5 at %.

12. The multilayer electronic component according to claim 11, wherein the internal electrode includes a Dy oxide.

13. The multilayer electronic component according to claim 12, wherein the Dy oxide is disposed in a region extending from an interface between the internal electrode and the dielectric layer to a point of ⅓ of a thickness of the internal electrode.

14. The multilayer electronic component according to claim 13, wherein the Dy oxide is $Dy_2O_3$.

15. The multilayer electronic component according to claim 1, wherein the internal electrode includes a plurality of Ni grains, and an amount (at %) of Dy included in a grain boundary between the plurality of Ni grains is greater than an amount (at %) of Dy included in the Ni grains.

16. The multilayer electronic component according to claim 1, wherein the internal electrode does not include $BaTiO_3$.

17. The multilayer electronic component according to claim 1, wherein an average thickness of the internal electrodes is 0.45 μm or less.

18. The multilayer electronic component according to claim 1, wherein an average thickness of the dielectric layer is 0.45 μm or less.

19. The multilayer electronic component according to claim 1, wherein a maximum size of the multilayer electronic component in a length direction is 0.44 mm or less and a maximum size thereof in a width direction is 0.22 mm or less.

20. A multilayer electronic component comprising:
a sintered body including a dielectric layer and internal electrodes having the dielectric layer interposed therebetween in a first direction; and
external electrodes disposed on the sintered body and connected to the internal electrodes,
wherein the internal electrodes include a dysprosium (Dy) oxide and does not include barium (Ba), and
wherein the internal electrodes include nickel (Ni) and dysprosium (Dy) in amounts satisfying formula: 0.02 at %≤C0≤5 at % in which C0 is an atomic percentage (at %) calculated by dividing a number of atoms of Dy by a sum of a number of atoms of Ni and Dy included in the internal electrodes.

21. The multilayer electronic component according to claim 20, wherein the internal electrodes include Ni and Dy in amounts satisfying formula: C0<C1 in which C1 is an atomic percentage (at %) calculated by dividing a number of atoms of Dy by a sum of a number of atoms of Ni and Dy in a region of the internal electrode having a distance of 2 nm or less from an interface with the dielectric layer in the first direction.

22. The multilayer electronic component according to claim 21, wherein the internal electrodes include Ni and Dy in amounts satisfying formula: 0.07 at %≤C1≤7 at %.

23. The multilayer electronic component according to claim 22, wherein the internal electrodes include Ni and Dy in amounts satisfying formulae: C2≤2.3 at % and C2<C0<C1 in which C2 is an atomic percentage (at %) calculated by dividing a number of atoms of Dy by a sum of a number of atoms of Ni and Dy at a center of the internal electrode in the first direction.

24. A multilayer electronic component comprising:
a body including a dielectric layer and internal electrodes having the dielectric layer interposed therebetween in a first direction,
wherein the internal electrodes include nickel (Ni) and dysprosium (Dy) in amounts satisfying formulae: C2≤2.3 at % in which C2 is an atomic percentage (at %) calculated by dividing a number of atoms of Dy by a sum of a number of atoms of Ni and Dy at a center of the internal electrode in the first direction, and
an atom percent of Dy relative to a sum of Ni and Dy in the center of the internal electrode increases toward an interface between the internal electrode and the dielectric layer.

25. The multilayer electronic component according to claim 24, wherein the internal electrodes include Ni and Dy in amounts satisfying formula: 0.07 at %≤C1≤7 at % in which C1 is an atomic percentage (at %) calculated by dividing a number of atoms of Dy by a sum of a number of atoms of Ni and Dy in a region of the internal electrode having a distance of 2 nm or less from an interface with the dielectric layer in the first direction.

26. The multilayer electronic component according to claim 24, wherein the internal electrodes include Ni and Dy in amounts satisfying formula: C2<C1.

* * * * *